(12) United States Patent
Son

(10) Patent No.: US 10,396,371 B2
(45) Date of Patent: Aug. 27, 2019

(54) CONCAVE FUEL CELL KNOCK OUT DRAIN

(71) Applicant: Ford Global Technologies, LLC, Dearborn, MI (US)

(72) Inventor: Seha Son, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 15/589,251

(22) Filed: May 8, 2017

(65) Prior Publication Data

US 2018/0323451 A1 Nov. 8, 2018

(51) Int. Cl.
| | |
|---|---|
| *H01M 8/04119* | (2016.01) |
| *H01M 8/04223* | (2016.01) |
| *B60L 11/18* | (2006.01) |
| *B60R 16/023* | (2006.01) |
| *B60L 50/72* | (2019.01) |
| *H01M 16/00* | (2006.01) |
| *B60L 50/64* | (2019.01) |
| *H01M 8/1018* | (2016.01) |

(52) U.S. Cl.
CPC ......... *H01M 8/04179* (2013.01); *B60L 50/72* (2019.02); *B60R 16/023* (2013.01); *H01M 8/04164* (2013.01); *H01M 8/04253* (2013.01); *H01M 16/006* (2013.01); *B60L 50/64* (2019.02); *B60Y 2200/91* (2013.01); *H01M 2008/1095* (2013.01); *H01M 2250/20* (2013.01); *H01M 2250/402* (2013.01)

(58) Field of Classification Search
CPC combination set(s) only.
See application file for complete search history.

(56) References Cited

U.S. PATENT DOCUMENTS

| | | | |
|---|---|---|---|
| 9,077,004 B2 | 7/2015 | Daum | |
| 9,190,675 B2 | 11/2015 | Barter et al. | |
| 9,437,890 B2 | 9/2016 | Milacic et al. | |
| 2013/0202976 A1* | 8/2013 | Chikugo | H01M 8/04089 429/414 |
| 2014/0255814 A1 | 9/2014 | Mathie et al. | |
| 2014/0370413 A1* | 12/2014 | Kilmer | H01M 8/04 429/450 |

* cited by examiner

*Primary Examiner* — Christopher P Domone
(74) *Attorney, Agent, or Firm* — David Kelley; Brooks Kushman, P.C.

(57) ABSTRACT

A vehicle includes a high-voltage bus and an electric motor electrically coupled to the bus. The vehicle further includes a fuel cell system electrically coupled to the bus. The fuel cell system includes a fuel stack and a reservoir in fluid connection with the fuel stack. The reservoir has a concave, generally conically-shaped bottom wall extending upwardly into and forming an apex within a cavity of the reservoir. The reservoir further includes a valve receptacle extending from a sidewall of the reservoir into the cavity of the reservoir. The valve receptacle defines a drain aperture and an outlet orifice having a bottom edge disposed proximate the apex of the bottom wall. The fuel cell system further includes a drain tube in fluid communication with the drain aperture and a control valve disposed within the valve receptacle and adapted to control fluid communication between the outlet orifice and the drain aperture.

20 Claims, 4 Drawing Sheets

CONCAVE FUEL CELL KNOCK OUT DRAIN

TECHNICAL FIELD

This disclosure relates generally to a water removal system for a fuel cell.

BACKGROUND

During fuel cell operation, byproducts such as product water and nitrogen, as well as unconsumed hydrogen, may form at the anode side of a fuel cell stack. In certain known systems, accumulation of product water and nitrogen accumulation is controlled in an attempt to avoid a reduction in fuel cell performance, and/or fuel cell system shut down. One known approach is to release the water and nitrogen via a passageway downstream of the fuel cell stack. Using such approach, the passageway is coupled with a valve for the controllable release of water and nitrogen from the fuel cell stack. This approach causes the potential for problems to occur during cold weather operation of the fuel cell when water may freeze in the passageway, or valve, or other regions of the fuel cell with small cross sectional areas. The resulting ice formation may cause blockage of at least a portion of the passageway and prevent fluid flow (e.g., water and nitrogen removal), which may inhibit fuel cell system function.

To avoid the blockage of fuel cell knock out drain under cold ambient condition, various methods have been employed with additional hardware. For example, a "scavenging reservoir" may be employed to provide an open passage adjacent to ice. However, in many instances, the increased volume of the water due to freezing may cause a complete blockage at the reservoir outlet, thereby inhibiting drainage of the fluid.

Ice blockage may also inhibit drainage of the fluid when the vehicle is parked on an incline. In many instances, a reservoir outlet is disposed at an outer periphery of the reservoir. When the vehicle is parked on an incline, ice blockage may occur at the reservoir outlet, thereby inhibiting drainage of the fluid.

SUMMARY

A vehicle includes a high-voltage bus and an electric motor electrically coupled to the bus. The vehicle further includes a fuel cell system electrically coupled to the bus. In some approaches, the fuel cell system includes an anode side, a cathode side, and a membrane disposed therebetween.

The fuel cell system includes a fuel stack and a reservoir in fluid connection with the fuel stack. In some approaches, the reservoir includes an inlet adapted to receive a fluid mixture of hydrogen gas, nitrogen gas, and water from an output of the anode side of the fuel stack.

The reservoir has a concave, generally conically-shaped bottom wall extending upwardly into and forming an apex within a cavity of the reservoir. In some approaches, at least a portion of the concave bottom wall extends upwardly into the cavity of the reservoir at an angle between approximately 15 and 25 degrees relative to a horizontal plane extending between bottom edges of sidewalls of the reservoir.

The reservoir further includes a valve receptacle extending from a sidewall of the reservoir into the cavity of the reservoir. In some approaches, at least a portion of the valve receptacle protrudes through the concave, generally conically-shaped bottom wall.

The valve receptacle defines a drain aperture and an outlet orifice having a bottom edge disposed proximate the apex of the bottom wall. The fuel cell system further includes a drain tube in fluid communication with the drain aperture and a control valve disposed within the valve receptacle and adapted to control fluid communication between the outlet orifice and the drain aperture.

In some approaches, at a first vehicle inclination in a first slope direction, a water level is maintained at a predetermined height proximate the apex of the bottom wall. At a second vehicle inclination in a second slope direction opposite the first slope direction, the water level may be maintained at the predetermined height proximate the apex of the bottom wall.

A fuel cell system may include a fuel stack and a reservoir in fluid connection with the fuel stack. The reservoir may have a concave, generally conically-shaped bottom wall forming an apex within a cavity of the reservoir. The concave, generally conically-shaped bottom wall may extend upwardly into the cavity of the reservoir at an angle between approximately 15 and 25 degrees relative to a horizontal plane extending between bottom edges of sidewalls of the reservoir.

The reservoir may further include a valve receptacle extending into the cavity of the reservoir. The valve receptacle may be a tubular valve receptacle that extends into the cavity of the reservoir. The valve receptacle may define a drain aperture and an outlet orifice having a bottom edge disposed at the apex of the bottom wall. The outlet orifice may substantially extend in a plane generally orthogonal to a plane defined by the drain aperture.

In one approach, the outlet orifice is substantially circular. In another approach, the outlet orifice is substantially triangular and may be oriented such that a first corner and a second corner of the substantially triangular outlet orifice are disposed above a third corner of the substantially triangular outlet orifice.

In some approaches, the valve receptacle includes an abutment surface disposed within the cavity of the reservoir between longitudinal walls of the tubular valve receptacle. The abutment surface may define the outlet orifice.

A control valve may be disposed within the valve receptacle and may be adapted to control fluid communication between the outlet orifice and the drain aperture.

A water removal system for a fuel cell may include a reservoir in fluid connection with the fuel cell. The reservoir may have a concave, generally conically-shaped bottom wall forming an apex within a cavity of the reservoir. The concave, generally conically-shaped bottom wall may extend upwardly into the cavity of the reservoir at an angle between approximately 15 and 25 degrees relative to a horizontal plane extending between bottom edges of sidewalls of the reservoir.

The reservoir may further include a valve receptacle extending into the cavity of the reservoir. The valve receptacle may define a drain aperture and an outlet orifice having a bottom edge disposed at the apex of the bottom wall.

The water removal system may further include a control valve disposed within the valve receptacle and adapted to control fluid communication between the outlet orifice and the drain aperture.

At a first vehicle inclination in a first slope direction, a water level may be maintained at a predetermined height proximate the apex of the bottom wall. At a second vehicle inclination in a second slope direction opposite the first slope direction, the water level may be maintained at the predetermined height proximate the apex of the bottom wall.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
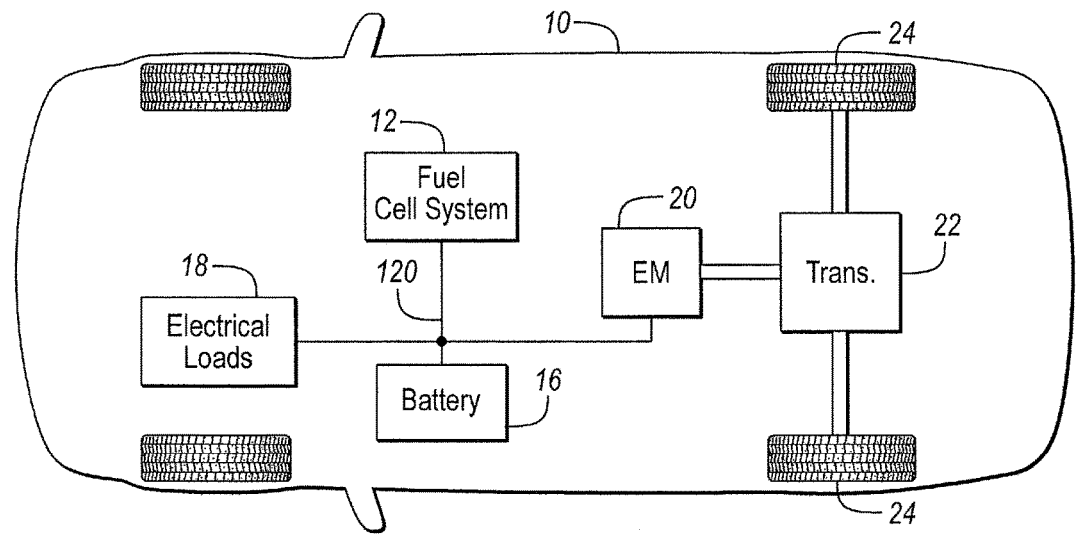
FIG. 1 illustrates a block diagram of a vehicle powered by a fuel cell system.

Referring now to FIG. 1, a vehicle 10 may be powered by a fuel cell system 12. The fuel cell system 12 may be electrically coupled to a high-voltage bus 14. A traction battery 16 may be electrically coupled to the high-voltage bus 14. Electrical loads 18 may be electrically coupled to the high-voltage bus 14. An electric machine 20 may be electrically coupled to the high-voltage bus 14 via a power inverter. The electric machine 20 may be mechanically coupled to a transmission 22. The transmission 22 may be mechanically coupled to drive wheels 24 of the vehicle 10.

The fuel cell system 12 may provide electrical power to operate the electric machine 20 to propel the vehicle 10 or perform other vehicle functions. The fuel cell system 12 may generate electrical power that may be consumed by the components coupled to the high-voltage bus 14 (e.g., electrical loads 18). Electrical power generated by the fuel cell system 12 may also be stored by the traction battery 16. The electric machine 20 converts the electrical energy into rotational mechanical energy to drive the transmission 22. The transmission 22 may include gears and clutches that are configured to translate the rotational energy of the electric machine 20 into rotational energy at the drive wheels 24.

Figure 2:
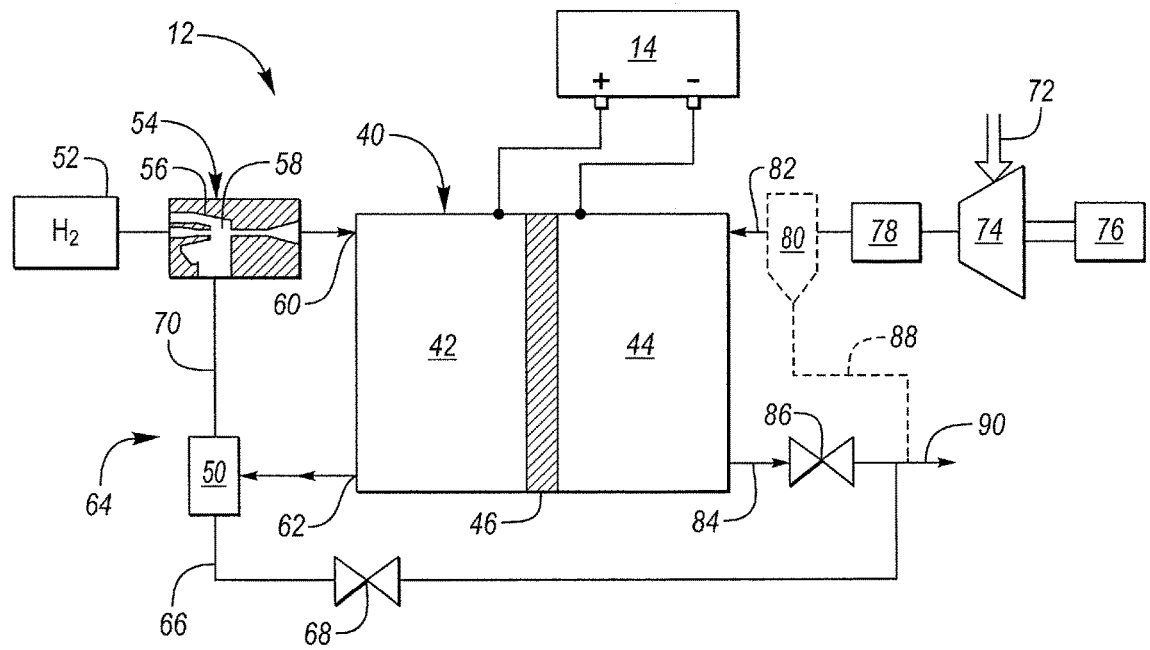
FIG. 2 illustrates a schematic of a fuel cell system.

FIG. 2 illustrates one possible configuration of the fuel cell system 12 as a process flow diagram. The fuel cell system 12 may be a proton exchange membrane fuel cell (PEMFC) as is known in the art. The fuel cell system 12 may contain a fuel cell stack 40. The stack 40 may include an anode side 42, a cathode side 44, and a membrane 46 therebetween. The fuel cell system 12 may electrically communicate with and provide energy, for example, to the high voltage bus 14 or the traction battery 16. The fuel cell stack 40 may also have a cooling loop (not shown).

During operation of the fuel cell system 12, water, residual fuel such as hydrogen, and byproducts such as nitrogen, may accumulate at the anode side 42 of the fuel cell stack 40. The fuel cell system 12 may be configured to remove the liquid water and byproducts and to reuse the residual hydrogen and water vapor. One approach may be to collect those constituents in a reservoir or separator 50 downstream of the fuel cell stack 40 that is configured to separate at least a portion of the liquid water and/or nitrogen and return the remaining constituents to the fuel cell stack 40 via a return passageway in a recirculation loop.

A primary fuel source 52 may be connected to the anode side 42 of the fuel cell stack 40, such as a primary hydrogen source. Non-limiting examples of the primary hydrogen source 52 may include a high-pressure hydrogen storage tank or a hydride storage device. The hydrogen source 52 may be connected to one or more ejectors 54. The ejector 54 may have a nozzle 56 supplying hydrogen into the converging section of a converging-diverging nozzle 58. The diverging section of the nozzle 58 may be connected to the input 60 of the anode side 42.

The output 62 of the anode side 42 may be connected to a passive recirculation loop 64. Typically, an excess of hydrogen gas is provided to the anode side 42 to ensure that there is sufficient hydrogen available to all the cells in the stack 40. In other words, hydrogen is provided to the fuel cell stack 40 above a stoichiometric ratio of one, i.e. at a fuel rich ratio relative to exact electrochemical needs. The recirculation loop 64 is provided such that excess hydrogen unused by the anode side 42 is returned to the input 60 so the excess may be used and not wasted.

Additionally, accumulated liquid and vapor phase water is an output of the anode side 42. The anode side 42 requires humidification for efficient chemical conversion and to extend membrane life. The recirculation loop 64 may be used to provide water to humidify the hydrogen gas before the input 60 of the anode side 42.

The recirculation loop 64 may include the separator 50, or water knock-out device. The separator 50 receives a stream or fluid mixture of hydrogen gas, nitrogen gas, and water from the output 62 of the anode side 42. The water may be mixed phase and contain both liquid and vapor phase water. The separator 50 may include a reservoir for holding a predetermined volume of water. The separator 50 removes at least a portion of the liquid phase water through a control valve 68 (may also be referred to as a drain valve). The liquid phase water may then exit the separator through drain line 66. At least a portion of the nitrogen gas, hydrogen gas, and vapor phase water may also exit the drain line 66, and pass, for example, during a purge process of the fuel cell stack 40. The control valve 68 may be closely integrated with the separator 50. Indeed, as will be appreciated, the control valve 68 may be integrated within the separator 50. The remainder of the fluid in the separator 50 exits through passageway 70 in the recirculation loop 64, which is connected to the ejector 54. The fluid in passageway 70 is fed into the converging section of the converging-diverging nozzle 58 where it mixes with incoming hydrogen from the nozzle 56 and hydrogen source 52.

Liquid water may be removed from the anode side 42 by the separator 50 to prevent water blockages within the channels and cells of the anode side 42. Water blockages within the fuel cell stack 40 may lead to decreases in cell voltage and/or voltage instabilities within the fuel cell stack 40. Liquid water may also be removed by the separator 50 to prevent a blockage or partial blockage within the ejector 54. A liquid water droplet in the diverging section of the converging-diverging nozzle 58 would effectively create a second venturi section within the nozzle 58 and lead to pumping instabilities for the ejector 54.

The cathode side 44 of the stack 40 receives oxygen, for example, as a constituent in an air source 72. In one embodiment, a compressor 74 is driven by a motor 76 to pressurize the incoming oxygen. The pressurized air is then humidified by a humidifier 78 before entering the cathode side 44. Another separator 80 (shown in phantom) may be positioned downstream of the humidifier 78. The separator 80 may be used to remove liquid water from the humidified air flow before it enters the cathode side 44 of the stack 40 at input 82. Water droplets may be present downstream of the humidifier 78 due to liquid water being entrained by air high flow rates within the humidifier 78. Liquid water may be removed by the separator 80 to prevent water blockages within the cells of the cathode side 44, leading to decreases in cell voltage and/or instabilities within the fuel cell stack 40. The cathode stack outlet 84 of the cathode side 44 is connected to a valve 86. Drain line 66 from separator 50, and a drain line 88 from separator 80 may be connected to a line 90 downstream of the valve 86. In other approaches, the drain lines may be plumbed to other locations in the fuel cell system 12.

Other system architectures may also be used for the fuel cell system 12. For example, a turbine may be used in addition to the compressor 74 to induce flow through the cathode side 44. In one example, a turbine is positioned downstream of the cathode stack outlet 84, with a separator interposed between the cathode side 44 and the turbine to remove liquid water before the fluid stream enters the turbine.

Based on the use of the ejector 54 to create flow through the anode side 42 and induce flow through the passive recirculation loop 64, the ejector 54 must overcome any pressure drops in the system, which includes a typically significant pressure drop across the fuel cell stack 40. The system 12 as shown does not include a pump or other device to induce flow in the recirculation loop 64, therefore all the compression work is accomplished by the ejector, otherwise described as a jet pump. To enable this function, the separator 50 may have a low pressure drop across it. The separator 50 may be configured to remove larger droplets of water from the fluid to prevent water blockages in the recirculating flow in the fuel cell stack 40 or ejector 54 caused by droplets. The separator 50 permits vapor phase water and smaller water droplets to remain in the recirculating flow in passageway 70 and return to the ejector 54 for humidification purposes. In one example, the separator 50 removes water droplets having a diameter on the order of one millimeter or larger.

Additionally, as the separator 50 receives fluid flow from the anode side 42, the separator 50 may be designed for use with hydrogen gas. Generally, hydrogen gas may cause material degradation or embrittlement issues and material used in the separator 50 may be hydrogen compatible. Additionally, hydrogen is a small molecule, and many conventional separator devices are not suitable for use with hydrogen because their design may permit leaks, for example, with a conventional threaded connection. Other conventional separators may contain rotating or moving parts, such as a rotating vane, or the like, which may not be compatible with hydrogen as the lubricant may poison the fuel cell stack, or the hydrogen may degrade or decompose the lubricant.

Separator 80 also needs to remove larger droplets of water from the fluid to prevent water blockages caused by droplets in the flow in the cathode side 44 of the fuel cell stack 40. The separator 80 permits vapor phase water, and smaller water droplets to remain in the flow for humidification. In one approach, the separator 80 removes water droplets that are the same size or larger than the cathode side 44 flow field channel widths. In one example, the cathode side flow field channels may be between 0.2 and 1.0 millimeters.

FIGS. 3-6 depict a possible configuration for the separator 50 and a drain valve 68. The features to be described are related to the separator 50 performing the function of accumulating and removing liquid water from the fuel cell system 12.

The separator 50 includes a bottom wall 100, a top wall 102, and a sidewall or sidewalls 104 extending between the bottom wall 100 and the top wall 102. The bottom wall 100, top wall 102, and sidewalls 104 form an interior cavity 106 therebetween.

In one approach, the top wall 102 is a generally planar top wall. The sidewalls 104 may form a generally cylindrical or tubular body. The cylindrical body may have an outer diameter between approximately 75 mm and 100 mm, and may be, for example, approximately 81 mm. Other suitable configurations and dimensions are contemplated.

The bottom wall 100 and the sidewalls 104 may form reservoir such that when the separator 50 is oriented vertically, liquid water accumulates above the inclined walls of the bottom wall 100.

In one approach, the bottom wall 100 is a generally concave, generally conically-shaped bottom wall. In this way, the bottom wall 100 may extend into the cavity 106. In other approaches, the bottom wall 100 is a generally concave, non-conically-shaped bottom wall extending into the cavity 106.

The concave bottom wall 100 may form an apex 110, for example, at a central region of the separator 50. The bottom wall 100 extends toward the apex 110 at an angle relative to a horizontal plane. For example, the bottom wall 100 may form an angle of between approximately 10 and 45 degrees, and more particularly, between approximately 15 and 25 degrees, relative to a horizontal plane extending between bottom edges of the sidewalls 104. In approach, the bottom wall 100 forms an angle of approximately 19.5 degrees. Other suitable angles of inclination are contemplated herein.

The separator 50 includes a valve receptacle 120 formed in the separator 50. The valve receptacle 120 defines a receiving aperture 122 disposed through the sidewall 104 of the separator 50. The receiving aperture 122 is preferably sized so as to receive a drain valve 68.

Sidewalls 124 of the valve receptacle 120 extend from the receiving aperture 122 into the interior cavity 106 of the separator 50. The sidewalls 124 may form a generally cylindrical or tubular body that extends longitudinally into the interior cavity 106 of the separator 50. The cylindrical body may have an outer diameter between approximately 20 mm and 45 mm, and may be, for example, approximately 35 mm. Other suitable configurations and dimensions are contemplated.

A protruding portion 126 of the sidewall 124 extends through the conical bottom wall 100 to a region below the bottom wall 100. At the protruding portion 126, the sidewall 124 defines a fluid outlet, also referred to as a drain orifice or aperture 130. The drain aperture 130 interfaces with the drain line 66 to permit fluid flow from the interior cavity 106 out of the separator 50 when the drain valve 68 is energized.

Figure 7:
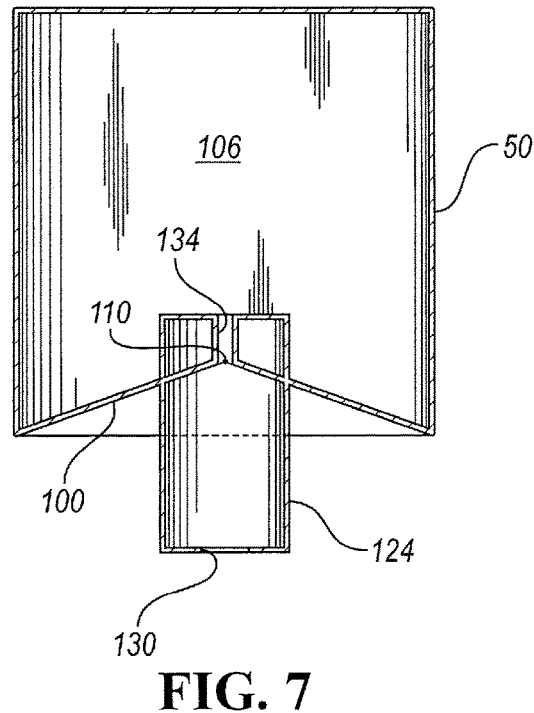
FIG. 7 illustrates a cross-sectional side elevation view of a schematic of an alternative separator for a fuel cell system.

In another approach, referring momentarily to FIG. 7, the valve receptacle 120 is disposed through the bottom wall 100. Such an approach may permit the use of a "rocker" type plunger. In this approach, a drain valve 68 may be inserted into the valve receptacle 120 from the bottom of the separator 50.

The sidewalls 124 of the valve receptacle 120 extend from the receiving aperture 122 to an abutment surface 132. The abutment surface 132 may be a vertically-oriented abutment surface. A portion of the abutment surface 132 that is adjacent the protruding portion 126 of the sidewall 124 extends through the conical bottom wall 100 to a region below the bottom wall 100.

The abutment surface 132 defines an outlet aperture, also referred to as an outlet orifice 134. The outlet orifice 134 may be a vertically-oriented outlet orifice disposed through the abutment surface 132. The outlet orifice 134 may substantially extend in a plane generally orthogonal to a plane defined by the drain aperture 130.

In one approach, the outlet orifice 134 is circular. The circular outlet orifice may have a diameter between approximately 3 mm and 6 mm, and may be, for example, approximately 5 mm.

In another approach, the outlet orifice 134 is triangular. The triangular outlet orifice may be oriented in an "upside down" orientation such that one corner is oriented below the two other corners. It has been observed that such a triangular outlet orifice may be provided with the same area as a circular orifice while providing a greater area in the upper region of the valve receptacle 120. For example, the height of a triangular outlet orifice may be about 17% higher than the height of a circular outlet orifice. In still another approach, the outlet orifice 134 is oval. Other outlet orifice geometries and dimensions are contemplated.

In one approach, a lowermost portion of the outlet orifice 134 is disposed proximate the apex 110 of the bottom wall 100. For example, the lowermost portion of the outlet orifice 134 may be disposed at the apex 110 of the bottom wall 100. In other approaches, the lowermost portion of the outlet orifice 134 is disposed above or below the apex 110 of the bottom wall 100.

The valve receptacle 120 may be integrally formed with the separator 50 such that the valve receptacle and the separator form a one-piece unit. For example, the integrally-formed separator-receptacle unit may be formed through an additive manufacturing process such as through a three-dimensional printing process. The integrally-formed separator-receptacle unit may be formed of a metallic material such as stainless steel or aluminum. Other suitable materials are contemplated. In still other approaches, the separator 50 and the valve receptacle 120 are separately formed, and may be assembled to form a separator-receptacle unit.

Figure 3:
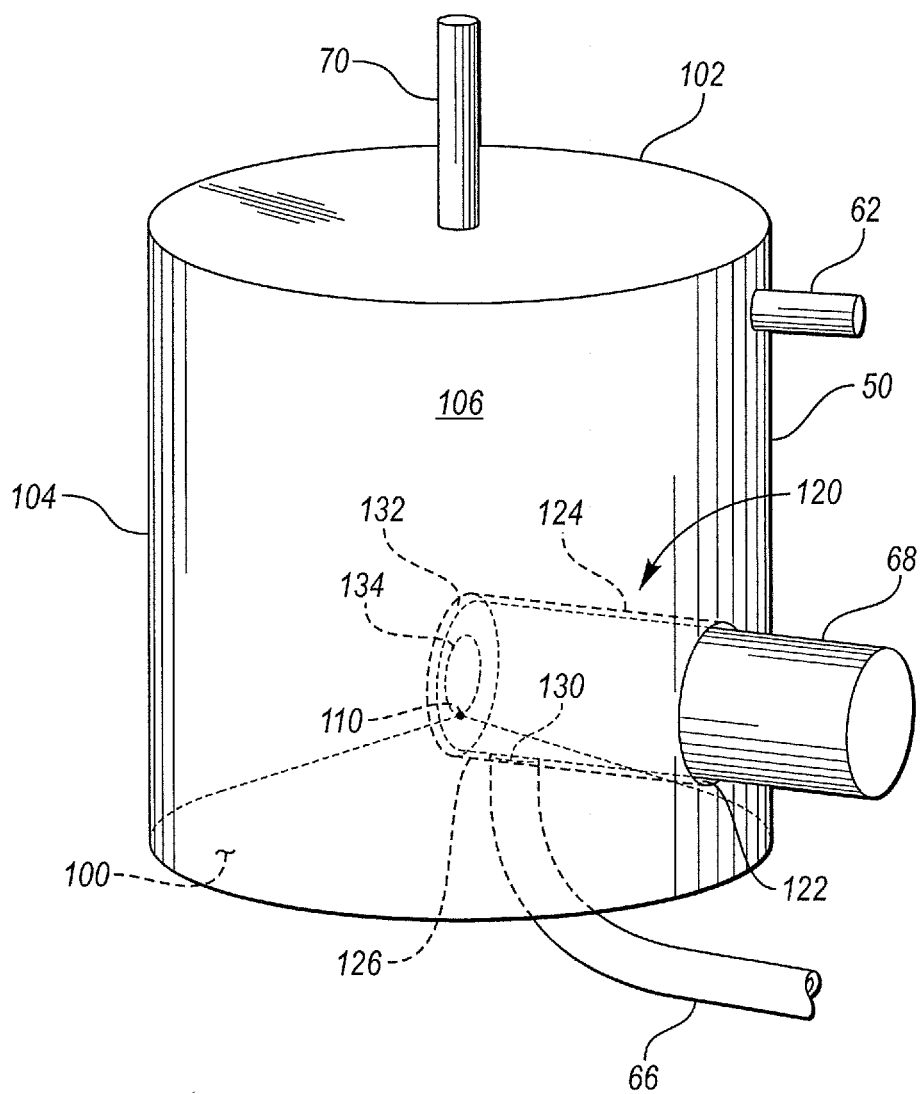
FIG. 3 illustrates a perspective view of a schematic of a separator for a fuel cell system.
Figure 4:
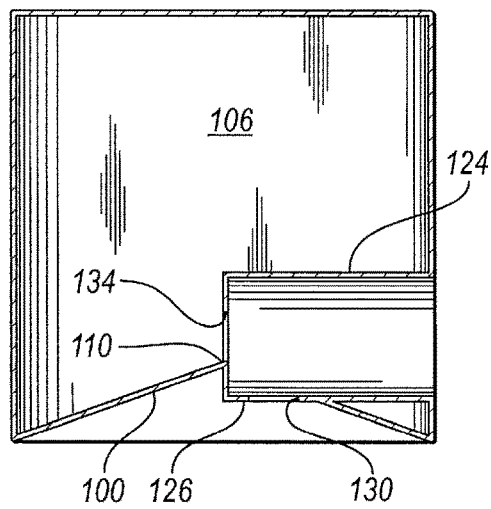
FIG. 4 illustrates a cross-sectional side elevation view of a schematic of a separator for a fuel cell system.
Figure 5:
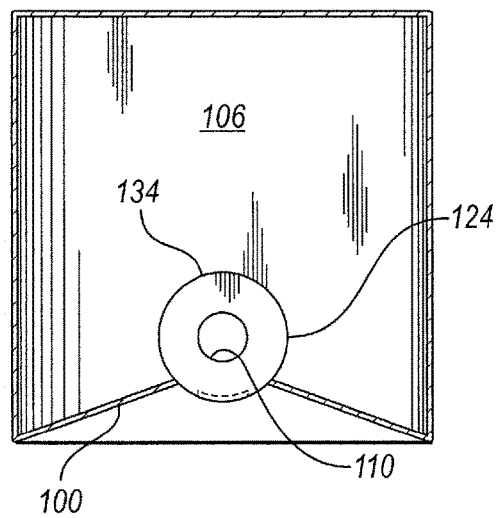
FIG. 5 illustrates a cross-sectional front elevation view of a schematic of a separator for a fuel cell system.
Figure 6:
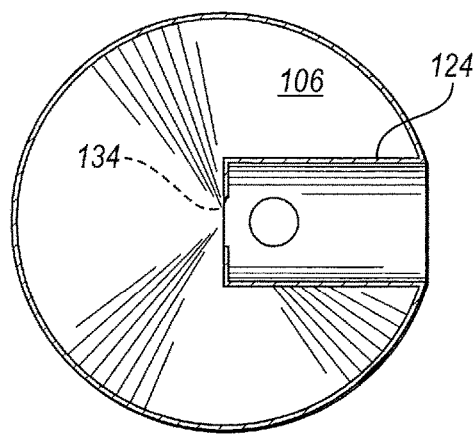
FIG. 6 illustrates a cross-sectional top plan view of a schematic of a separator for a fuel cell system.

As shown in FIG. 3, the drain valve 68 may be received in the valve receptacle 120 of the separator 50. The drain valve 68 may be, for example, a solenoid valve that includes a movable piston or plunger that is configured to move when the solenoid is energized or activated. Other suitable drain valves are contemplated herein.

The drain valve 68 may be a normally closed valve. In the closed state, the plunger may seal any passages between the outlet orifice 134 and the drain aperture 130 of the valve receptacle 120. In the open state, the plunger is positioned such that fluid flow between the outlet orifice 134 and the drain aperture 130 is allowed. Additional conduits may be utilized to transport water exiting the separator 50 for recirculation or removal.

During fuel cell operation, water may collect in the separator 50. The fuel cell system 12 may control a water level within the separator 50 to a predetermined level. During fuel cell operation, there may be a preferred water level for operating the fuel cell system 12. Further, during shutdown, the fuel cell system 12 may be configured to purge water from the separator 50 to prepare for the next operating cycle. The purge of water may also reduce the risk of freezing in cold weather. During fuel cell operation, the drain valve 68 may be periodically actuated to allow water to flow out of the separator 50 to maintain the preferred water level. For example, the when the drain valve 68 is energized, the plunger may be moved to the open position. When the plunger is in the open position, the outlet orifice 134 is fluidly connected to the drain aperture 130. As such, accumulated water in the separator 50 may flow through the outlet orifice 134 to the drain aperture 130. In this manner, the water level in the separator 50 may be reduced.

Water that is collected in the separator 50 poses problems in freezing weather conditions. After some time in below-freezing temperatures, water within the fuel cell system 12 may freeze to form ice. In previous approaches, frozen water in the separator can block the outlet orifice and prevent water from exiting the separator. Ice in the separator can cause the water level to become too high and eventually impede optimal operation of the fuel cell system 12.

Figure 8:
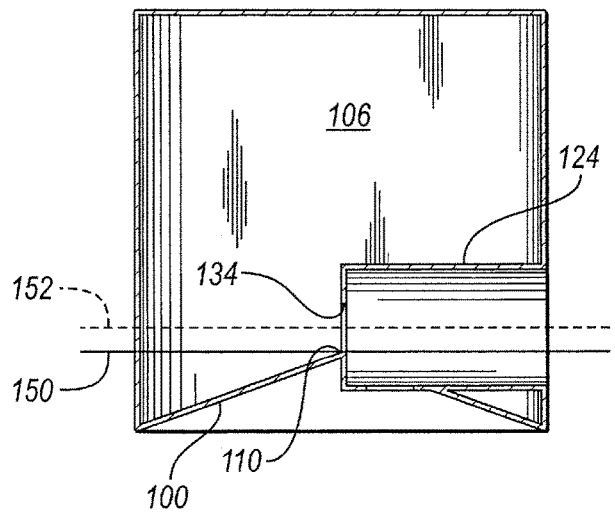
FIG. 8 illustrates a cross-sectional side elevation view of a schematic of a separator for a fuel cell system in a level orientation.

FIG. 8 depicts the separator 50 when the vehicle 10 is on a level surface. In the level orientation, the water level 150 may be maintained at a predetermined height, such as approximately at or below the height of the apex 110 during above-freezing conditions. During freezing conditions, the water may freeze, thereby expanding the volume of the water such that the upper ice level 152 is higher than the height of the apex 110. It is observed that, even during freezing conditions, the upper ice level 152 is below the top of the outlet orifice 134. In this way, when the vehicle 10 is in a level position during freezing conditions, water may still be removed from the separator 50 by actuating the plunger of the drain valve 68.

Figure 9:
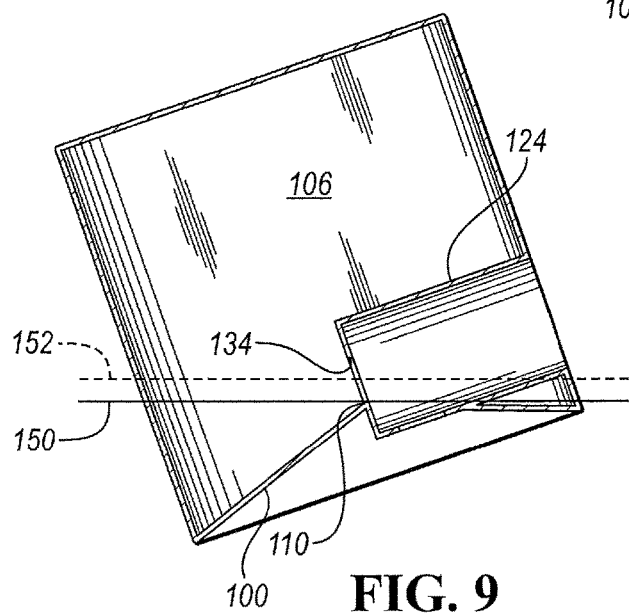
FIG. 9 illustrates a cross-sectional side elevation view of a schematic of a separator for a fuel cell system in a first inclined orientation.

FIG. 9 depicts the separator 50 when the vehicle 10 is on an inclined surface, sloped in a first direction (e.g., the front of the vehicle 10 is facing a downward slope). In this first inclined position, the water level 150 may be maintained at a predetermined height, such as approximately at or below the height of the apex 110 during above-freezing conditions. During freezing conditions, the water may freeze, thereby expanding the volume of the water such that the upper ice level 152 is higher than the height of the apex 110. It is observed that, even during freezing conditions, the upper ice level 152 is below the top of the outlet orifice 134 in the first inclined position. In this way, even when the vehicle 10 is in the first inclined position during freezing conditions, water may still be removed from the separator 50 by actuating the plunger of the drain valve 68.

Figure 10:
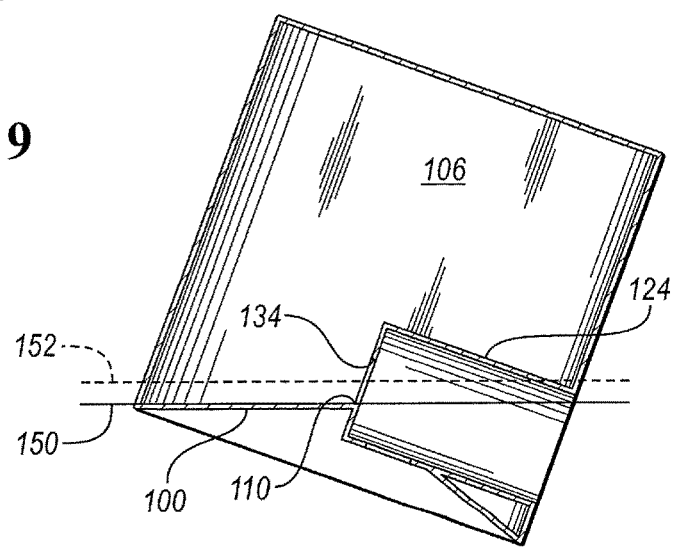
FIG. 10 illustrates a cross-sectional side elevation view of a schematic of a separator for a fuel cell system in a second inclined orientation.

FIG. 10 depicts the separator 50 when the vehicle 10 is on an inclined surface, sloped in a second direction opposite the first direction (e.g., the front of the vehicle 10 is facing an upward slope). In this second inclined position, the water level 150 may be maintained at a predetermined height, such as approximately at or below the height of the apex 110 during above-freezing conditions. During freezing conditions, the water may freeze, thereby expanding the volume of the water such that the upper ice level 152 is higher than the height of the apex 110. It is observed that, even during freezing conditions, the upper ice level 152 is below the top of the outlet orifice 134 in the second inclined position. In this way, even when the vehicle 10 is in the second inclined position during freezing conditions, water may still be removed from the separator 50 by actuating the plunger of the drain valve 68.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a high-voltage bus;
an electric motor electrically coupled to the high-voltage bus; and
a fuel cell system electrically coupled to the high-voltage bus, wherein the fuel cell system includes
a fuel stack,
a reservoir in fluid connection with the fuel stack, wherein the reservoir has a generally concave bottom wall extending upwardly into and forming an apex within a cavity of the reservoir, wherein the reservoir further includes a valve receptacle extending from a sidewall of the reservoir into the cavity of the reservoir, wherein the valve receptacle defines a drain aperture and an outlet orifice having a bottom edge disposed proximate the apex of the bottom wall,
a drain tube in fluid communication with the drain aperture, and
a solenoid valve disposed within the valve receptacle and adapted to control fluid communication between the outlet orifice and the drain aperture.

2. The vehicle of claim 1, wherein the fuel cell system comprises an anode side, a cathode side, and a membrane disposed therebetween.

3. The vehicle of claim 2, wherein the reservoir includes an inlet adapted to receive a fluid mixture of hydrogen gas, nitrogen gas, and water from an output of the anode side of the fuel stack.

4. The vehicle of claim 1, wherein at least a portion of the concave bottom wall extends upwardly into the cavity of the reservoir at an angle between approximately 15 and 25 degrees relative to a horizontal plane extending between bottom edges of sidewalls of the reservoir.

5. The vehicle of claim 1, wherein at least a portion of the valve receptacle protrudes through the concave, generally conically-shaped bottom wall.

6. The vehicle of claim 1, wherein at a first vehicle inclination in a first slope direction, a water level is maintained at a predetermined height proximate the apex of the bottom wall.

7. The vehicle of claim 6, wherein at a second vehicle inclination in a second slope direction opposite the first slope direction, the water level is maintained at the predetermined height proximate the apex of the bottom wall.

8. A fuel cell system comprising:
a fuel stack; and
a reservoir in fluid connection with the fuel stack, the reservoir having a concave, generally conically-shaped bottom wall forming an apex within a cavity of the reservoir, the reservoir further including a valve receptacle extending into the cavity of the reservoir, the valve receptacle defining a drain aperture and an outlet orifice having a bottom edge disposed at the apex of the bottom wall.

9. The fuel cell system of claim 8, wherein the valve receptacle is a tubular valve receptacle that extends into the cavity of the reservoir.

10. The fuel cell system of claim 9, wherein the valve receptacle includes an abutment surface disposed within the cavity of the reservoir between longitudinal walls of the tubular valve receptacle, and wherein the abutment surface defines the outlet orifice.

11. The fuel cell system of claim 8, wherein the concave, generally conically-shaped bottom wall extends upwardly into the cavity of the reservoir at an angle between approximately 15 and 25 degrees relative to a horizontal plane extending between bottom edges of sidewalls of the reservoir.

12. The fuel cell system of claim 8, further comprising a control valve disposed within the valve receptacle and adapted to control fluid communication between the outlet orifice and the drain aperture.

13. The fuel cell system of claim 8, wherein the outlet orifice substantially extends in a plane generally orthogonal to a plane defined by the drain aperture.

14. The fuel cell system of claim 8, wherein the outlet orifice is substantially circular.

15. The fuel cell system of claim 8, wherein the outlet orifice is substantially triangular and is oriented such that a first corner and a second corner of the substantially triangular outlet orifice are disposed above a third corner of the substantially triangular outlet orifice.

16. A water removal system for a fuel cell comprising:
a reservoir in fluid connection with the fuel cell, the reservoir having a concave, generally conically-shaped bottom wall forming an apex within a cavity of the reservoir, the reservoir further including a valve receptacle extending into the cavity of the reservoir, the valve receptacle defining a drain aperture and an outlet orifice having a bottom edge disposed at the apex of the bottom wall.

17. The water removal system of claim 16, wherein the concave, generally conically-shaped bottom wall extends upwardly into the cavity of the reservoir at an angle between approximately 15 and 25 degrees relative to a horizontal plane extending between bottom edges of sidewalls of the reservoir.

18. The water removal system of claim 16, further comprising a control valve disposed within the valve receptacle and adapted to control fluid communication between the outlet orifice and the drain aperture.

19. The water removal system of claim 16, wherein at a first vehicle inclination in a first slope direction, a water level is maintained at a predetermined height proximate the apex of the bottom wall.

20. The water removal system of claim 19, wherein in at a second vehicle inclination in a second slope direction opposite the first slope direction, the water level is maintained at the predetermined height proximate the apex of the bottom wall.

* * * * *